United States Patent
Volonterio et al.

(10) Patent No.: US 6,211,667 B1
(45) Date of Patent: Apr. 3, 2001

(54) ELECTRONIC POSITION TRANSMISSION DEVICE ADAPTED TO TRANSMIT THE POSITION OF STEM OF VALVES

(75) Inventors: Eugenio Volonterio, Appiano Gentile; Riccardo Borelli, Lenno, both of (IT)

(73) Assignee: ABB Kent Taylor S.p.A., Lenno (IT)

( * ) Notice: Subject to any disclaimer, the term of this patent is extended or adjusted under 35 U.S.C. 154(b) by 0 days.

(21) Appl. No.: 09/176,093

(22) Filed: Oct. 21, 1998

(30) Foreign Application Priority Data

Oct. 24, 1997 (IT) .................................. MI97A2406

(51) Int. Cl.$^7$ .................................. G01B 7/14; G01B 7/30
(52) U.S. Cl. .................................. 324/207.18; 324/207.25; 324/207.16; 336/45
(58) Field of Search .................. 324/207.12, 207.15, 324/207.16, 207.17, 207.18, 225, 236, 239, 242, 243, 260, 262, 173; 336/46, 130, 136; 340/870.31, 870.32, 870.35, 870.36

(56) References Cited

U.S. PATENT DOCUMENTS

| | | | | |
|---|---|---|---|---|
| 4,673,827 | * | 6/1987 | Sommer | 324/207.18 |
| 4,810,964 | * | 3/1989 | Granberg et al. | 324/207.18 |
| 4,906,924 | * | 3/1990 | Zannis | 324/207.18 |
| 5,160,886 | * | 11/1992 | Carlen | 324/207.16 |

FOREIGN PATENT DOCUMENTS

| | | | |
|---|---|---|---|
| 37 13 562 | | 11/1988 | (DE) . |
| 3713562 | * | 11/1988 | (DE) . |
| 39 00 866 | | 7/1990 | (DE) . |
| 3900866 | * | 7/1990 | (DE) . |
| 2 554 581 | | 5/1985 | (FR) . |
| 2554581 | * | 5/1985 | (FR) . |
| 2 054 160 | | 2/1981 | (GB) . |
| 2054160 | * | 2/1981 | (GB) . |
| 2299675 | * | 10/1996 | (GB) . |
| 2 299 675 | | 10/1996 | (GB) . |
| 01176880 | * | 7/1989 | (JP) . |

OTHER PUBLICATIONS

Patent Abstract of Japan vol. 013, No. 455 (M–879), Oct. 13, 1989 & JP 01 176880 A (Toto Ltd), Jul. 13, 1989 * abstract *.

* cited by examiner

*Primary Examiner*—Jay Patidar
(74) *Attorney, Agent, or Firm*—Guido Modiano; Albert Josif; Daniel O'Byrne

(57) ABSTRACT

A device for measuring the displacement of stems of valves having a spindle coupled to a stem of a valve and provided with two inductive pickups; each inductive pickup is formed by a fixed part and a movable part constituting a variable inductor, which, following a displacement of the stem and a rotation of the spindle coupled thereto, generates an inductance variation of the electric circuit associated thereto; electronic excitation and detection means are adapted to convert the inductance variations into a pair of digital signals whose difference is indicative of the displacement of the stem.

16 Claims, 5 Drawing Sheets

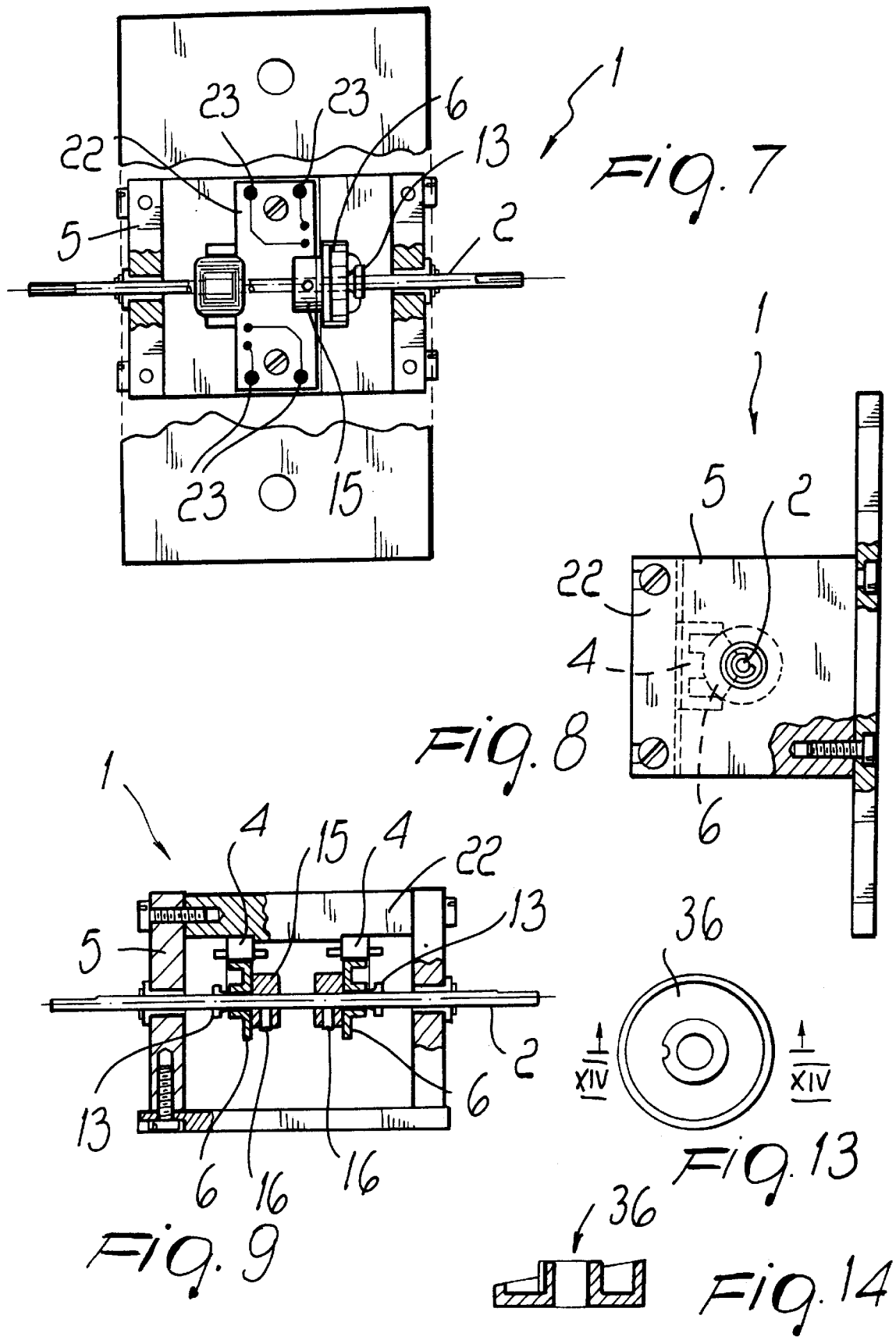

ELECTRONIC POSITION TRANSMISSION DEVICE ADAPTED TO TRANSMIT THE POSITION OF STEM OF VALVES

BACKGROUND OF THE INVENTION

The present invention relates to a device for measuring the displacement of stems of valves; more particularly, the invention relates to an electronic position transmission device adapted to transmit, according to a linear law, the position of the stem of valves, such as adjustment valves or rotary valves.

As it is known, in the field of adjustment valves it is particularly important to know at all time the position of the stem of the valve in order to know the state of the valve time by time.

Position transducers currently used for this purpose suffer the drawback that they do not offer high measurement precision and are further affected by mechanical displacements caused not by the angular movement of the stem of the valve whose position is to be detected but, for example, by thermal expansions.

It is commonly known to use a rotating potentiometer as a position transducer; however, such potentiometer entails the drawback that it has components which are subject to friction wear and also requires shielding for protection against the inevitable sparks generated during its operation.

Another type of position transducer that is currently used is a differential transformer, which however entails the drawback of being expensive.

SUMMARY OF THE INVENTION

The main aim of the present invention is to provide a device for measuring the displacement of stems of valves, which provides a highly precise measurement.

Within the scope of this aim, an object of the present invention is to provide a device for measuring the displacement of stems of valves, whose obtainable measurement allows to minimize the effects of mechanical displacements not caused by angular movement, such as for example thermal expansions.

Another object of the present invention is to provide a device for measuring the displacement of stems of valves, which allows to obtain a linear measurement signal.

Another object of the present invention is to provide a device for measuring the displacement of stems of valves, having a modest power consumption.

Another object of the present invention is to provide a device for measuring the displacement of stems of valves, which is highly reliable, relatively easy to manufacture and at low costs.

This aim, these objects and others which will become apparent hereinafter are achieved by a device for measuring the displacement of stems of valves, characterized in that it comprises a spindle coupled to a stem of a valve and provided with two inductive pickups, each inductive pickup comprising a fixed part and a movable part constituting a variable inductor, which, following a displacement of said stem and a rotation of the spindle coupled thereto, generates an inductance variation of the electric circuit associated thereto;

electronic excitation and detection means adapted to convert said inductance variations into a pair of digital signals whose difference is indicative of the displacement of the stem.

In a further aspect, the present invention relates to a method for measuring the displacement of stems of valves, characterized in that it comprises the steps of:

transforming the displacement of the stem into a rotation of a spindle coupled to said stem, said spindle being provided with two inductive pickups, each inductive pickup comprising a fixed part 4 and a movable part 6 constituting a variable inductor, which, following the displacement of said stem and a rotation of the spindle coupled thereto, generates an inductance variation of the electric circuit associated thereto;

converting, by electronic excitation and detection means, said inductance variations into a pair of digital signals;

carrying out the difference between said pair of digital signals, said difference being indicative of the displacement of the stem.

BRIEF DESCRIPTION OF THE DRAWINGS

Further characteristics and advantages of the present invention will become apparent from the following detailed description of preferred but not exclusive embodiments of the device according to the invention, illustrated only by way of non-limitative example in the accompanying drawings, wherein:

FIG. 7 is a partially cutout plan view of the measurement device according to the invention;

FIG. 8 is a sectional side elevation view of the measurement device according to the present invention;

FIG. 9 is a sectional side view of the measurement device according to the present invention;

FIG. 13 is a plan view of a fourth preferred embodiment of the ferrite sectors; and FIG. 14 is a sectional view, taken along the plane XIV–XIV, of the ferrite sector shown in FIG. 13.

DESCRIPTION OF THE PREFERRED EMBODIMENTS

Figure 1:
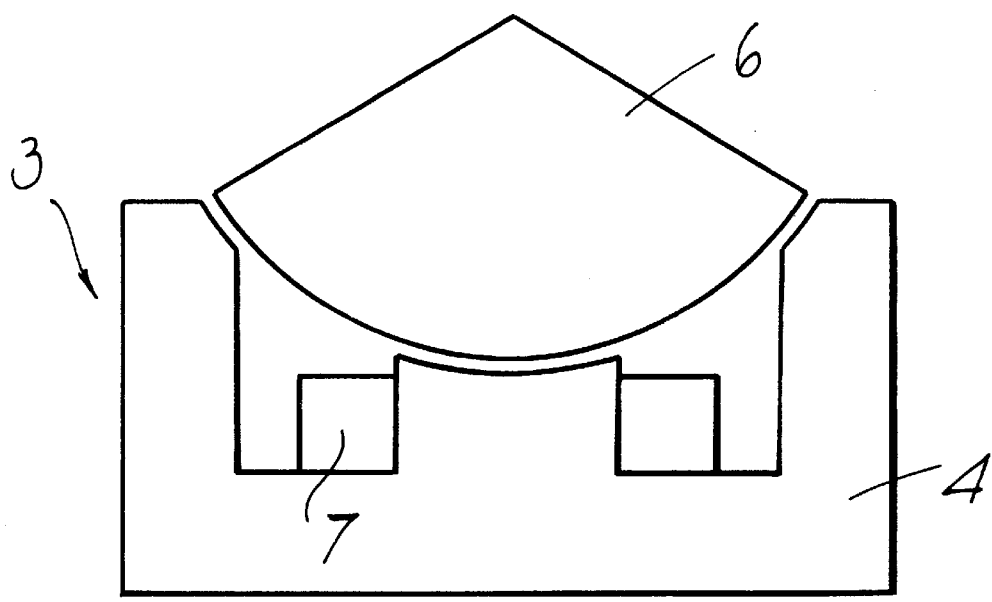
FIG. 1 is a schematic plan view of the pickup of the device according to the invention.

With reference to the above mentioned figures, the device according to the invention, generally designated by the reference numeral 1, comprises a spindle 2 coupled to a stem of a valve, such as an adjustment valve or a rotary valve (not shown); on said spindle 2 two inductive pickups, generally designated by the reference numeral 3, are arranged.

In particular, in case of a rotating stem, the spindle 2 can be directly coupled to the stem itself; if the stem slides, coupling can be realized through a mechanism (not shown) which transforms the translation of the stem into a rotation of the spindle.

Figure 15:
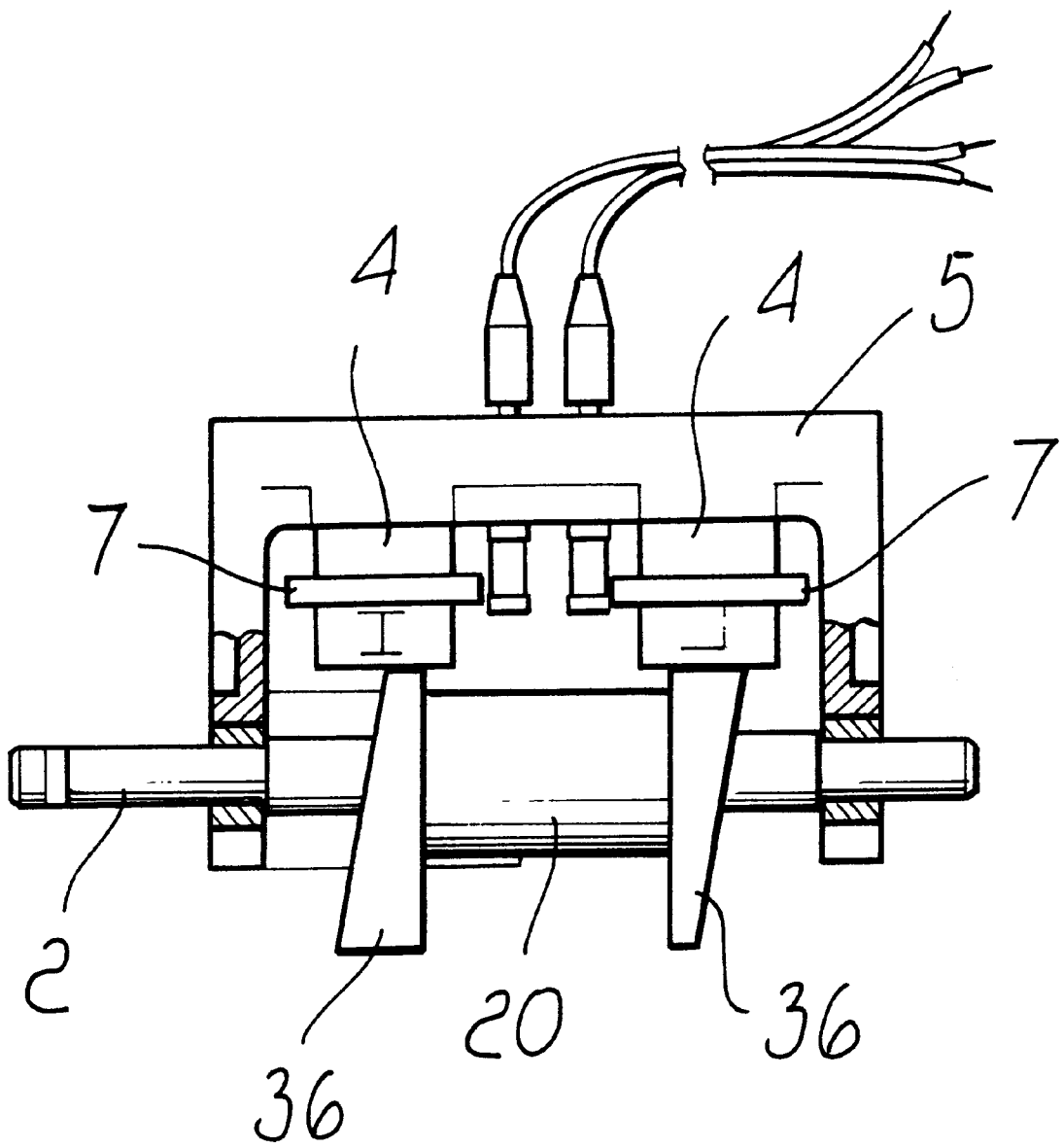
FIG. 15 is a schematic view illustrating a preferred embodiment of the device according to the invention.

Each inductive pickup 3 comprises a fixed part, constituted by a ferrite core 4 coupled to the structure of the sensor, i.e. to a casing 5, and by a movable part 6 made of ferrite and coupled to the spindle 2; the casing 5 is preferably made of aluminum and is realized in one open part only, as shown in FIG. 15; alternatively, the casing 5 can be realized by two halves that enclose the sensor, as illustrated in FIG. 9. Each pairs fixed part 4-movable part 6 constitutes a variable inductor.

A copper winding 7 is provided on the fixed part 4 and constitutes the excitation coil. Preferably, said fixed part 4 has an E-shaped transverse cross-section with copper windings 7 provided around the shorter central wing. Alternatively the transverse cross section can present an U-shaped profile.

In both cases, the parallel wings of the E or U can be chamfered to accommodate the rotation of said movable part 6, as shown in FIG. 1.

Figure 6:
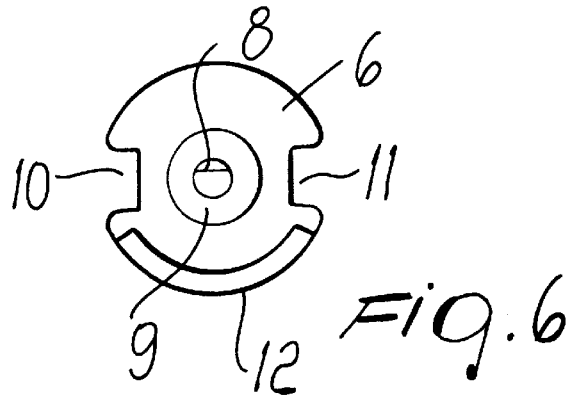
FIG. 6 is a plan view of a first embodiment of a ferrite sector according to the invention.
Figure 10:
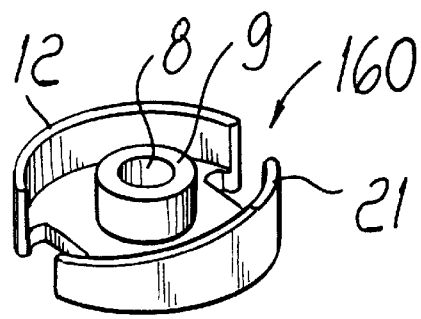
FIG. 10 is a perspective view of a second embodiment of the ferrite sector according to the present invention.

In a first embodiment, the movable part, constituted by a ferrite disk 6, is provided as shown in FIG. 6. Such disk has a central hole 8 which is surrounded by a sleeve 9 to allow the spindle 2 to pass through it.

Futhermore, the disk 6 has two diametrically opposite recesses 10 and 11 and a raised rim 12 which is arranged circumferentially around a portion of the disk itself.

Figure 11:
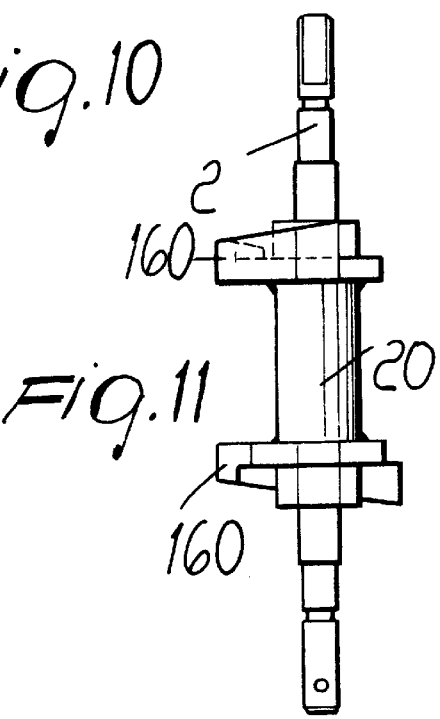
FIG. 11 is a side elevation view of a second preferred embodiment of the fixing of the ferrite sectors to the spindle, illustrating ferrite sectors according to a third embodiment.

A second embodiment of the movable part is shown in FIG. 11; according to this embodiment, the movable part 6 is constituted by a ferrite disk, now designated by the reference numeral 160, having a second raised rim 21 which is arranged opposite the raised rim 12.

Advantageously, said rim 21 presents a chamfer that allows to improve the accuracy of the position measurement made by the device according to the invention, as will become apparent in the following description.

Figure 12:
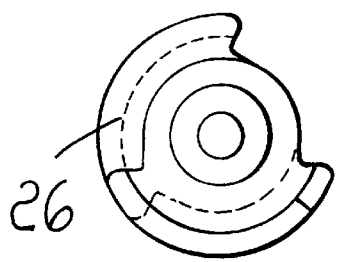
FIG. 12 is a plan view of a third embodiment of the ferrite sectors shown installed in FIG. 11.

FIG. 12 is instead a view of a third embodiment of the ferrite disk, now designated by the reference numeral 26.

Figure 5:
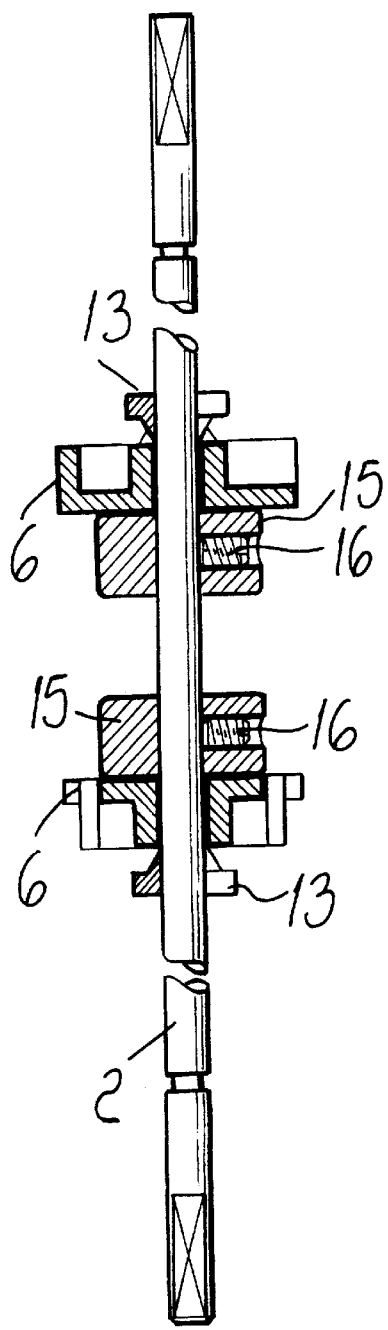
FIG. 5 is a sectional elevation view of the arrangement of a pair of ferrite sectors on a spindle which is meant to be coupled to the stem of a valve.

Finally, FIGS. 13 and 14 are views of a fourth, particularly preferred, embodiment of the ferrite disks, designated by the reference numeral 36 and shown fixed to the spindle 2 in FIG. 5. In this fourth embodiment, the disk 36 has one chamfered raised rim only; said rim is arranged circumferentially around the disk and does not have recesses.

A first embodiment for the fixing of the disks 6 (26 or 36 or 160) to the spindle 2 is shown in FIGS. 5 and 7–9. According to this embodiment, the disk 6 is coupled to the spindle 2 on one side by means of a wedge-shaped plug 13 which is fitted on the spindle 2 and glued on the sleeve 9 of the disk 6, and, on the opposite side, by a disk-like element 15 provided with a locking grub screw 16; in this manner, the disk 6 is kept rigidly coupled to the spindle.

The spindle 2 is fitted in an opening formed in the casing 5.

A second and particularly preferred manner of fixing the ferrite disks to the spindle 2 is shown in FIGS. 11 and 15. According to this embodiment, disks (36, or 160, or 26, or 6) are coupled to the spindle 2 by means of a sleeve 20 which is arranged around the spindle 2 between the pair of ferrite disks and is glued thereto.

Furthermore, the two ferrite disks (36, or 6 or 26 or 160) are respectively rotated through approximately 30° each other, with respect to the rotation axis of the spindle 2: however, different arrangement of the two ferrite disks can be provided with angular values other than the one indicated above.

A 180° arrangement (counterfase), illustrated in FIG. 15, is particurarly preferred.

Turning to the description of the inductive pickup, the ferrite core 4 is preferably directly coupled to the casing 5 of the device, as shown in FIG. 15; alternatively, as shown in FIG. 8, the ferrite core 4 is fixed to an aluminum base 22, for example by gluing. In turn, the base 22 is screwed on the casing 5; a printed circuit for welding rheophores 23 is also arranged on the aluminum base 22.

Figure 4:
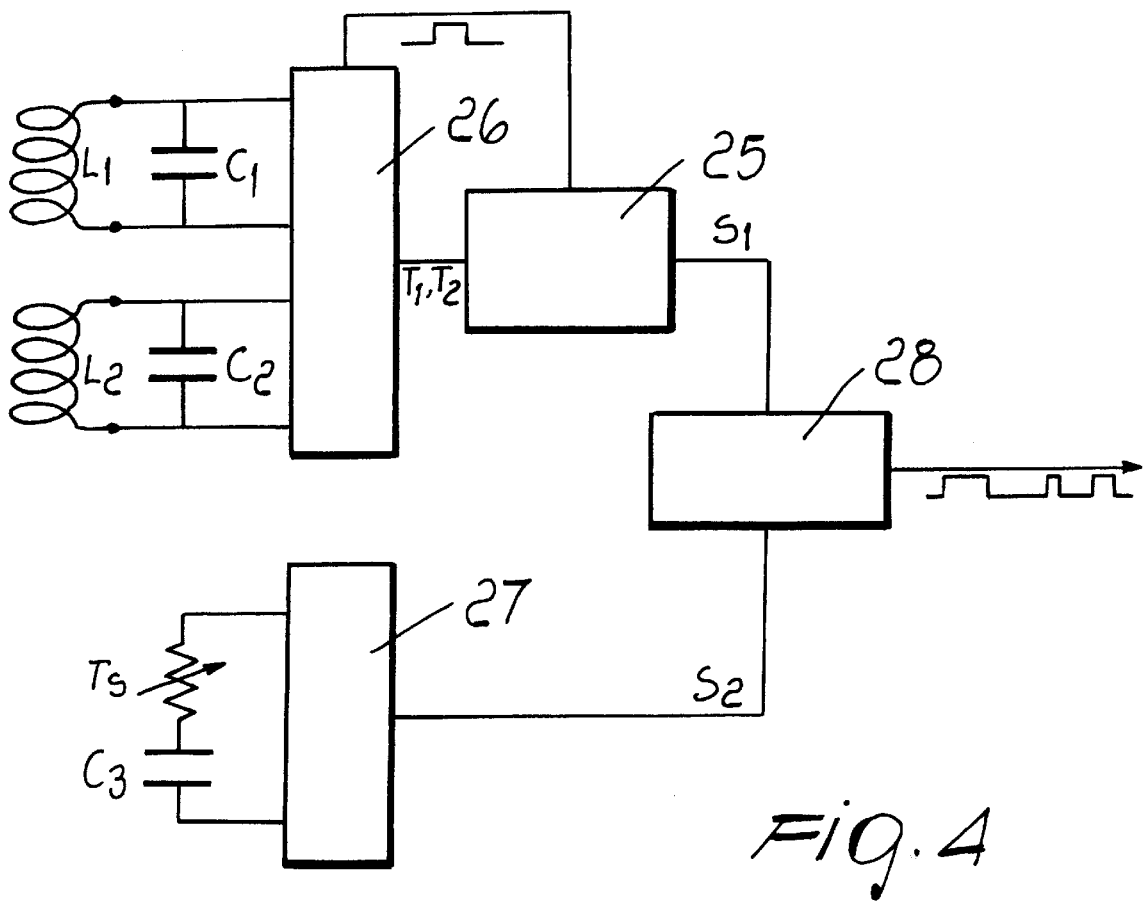
FIG. 4 is a block diagram of the electronic excitation and detection circuit of the device according to the present invention.

In order to detect the angular measure that indicates the position of the stem of the valve, electronic excitation and detection means, shown in FIG. 4, are provided; said excitation and detection means are preferably coupled to the casing of the device and are an integral part thereof.

The electronic excitation and detection means comprise an oscillator of the relaxation type, in which a pulse generator and counter circuit sends a short pulse alternatively to a first network $L_1C_1$, constituted by one of the inductors that constitute the pickup and by a fixed capacitor, and to a second network $L_2C_2$ which is constituted by the other inductor of the pickup and by another fixed capacitor.

The short pulse is sent by means of multiplexer means 26.

The electronic means are completed by a monostable device 27 which has a temperature compensation function with a corresponding network constituted by a capacitor $C_3$ and a variable resistor $T_s$. A combiner network 28 outputs the required measure signal.

With reference to the above figures, the operation of the device according to the invention is as follows, taking as an example the relative measurement of the angles of a stem of an adjustment valve.

Briefly, the movement of the valve stem coupled to the spindle 2 is converted into the rotation of the spindle, the position whereof is detected by the double inductive pickup, which produces a relative measurement of the rotation angle of the spindle, obtained by means of the difference between the measurements of each individual pickup. The value of the two inductors that constitute the pickup is in fact converted, by virtue of the electronic means, into two digital signals T1 and T2, whose difference is indicative of the required position measure.

In detail, the movement of the stem of the valve, converted into a rotation by means of the system for coupling to the spindle 2, produces a rotation of the spindle whereto the movable parts 36 (or 6 or 160 or 26) are connected.

The magnetic circuit closes gradually as the rotation of the spindle 2 continues and produces a different concatenation of the magnetic flux according to the position of the movable parts 6 with respect to the fixed parts 4.

Accordingly, the magnetic circuit varies its inductive value from a minimum, when the disk 36 (or 6 or 160 or 26) lies inside the area of the fixed part 4 only to a minimal extent, to the maximum value, which is obtained when the disk 36 (or 6 or 160 or 26) is fully immersed in the magnetic circuit.

Figure 2:
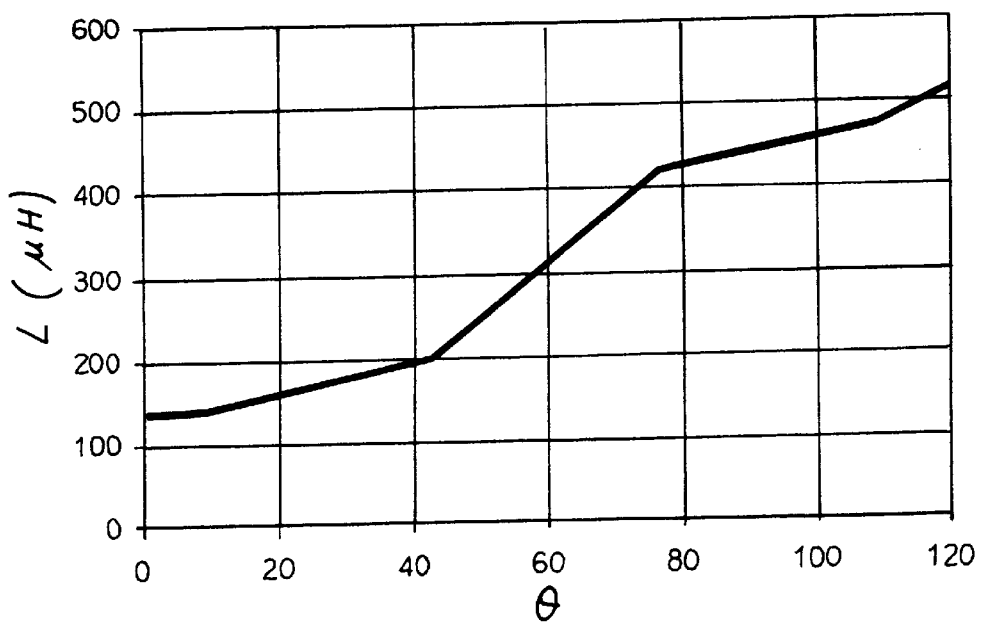
FIG. 2 is a graph illustrating the variation in inductance as a function of the rotation angle of a spindle used in the device, according to a first embodiment of the pickup.

The graph of FIG. 2 shows the variation in inductance as a function of the rotation angle of the spindle 2 and therefore of the disk 36 (or 6 or 160 or 26) coupled thereto, as a consequence of a movement of the valve stem whose position has to be determined. In particular, the graph 2 shows the variation in inductance when disks 6 are used.

The graph clearly shows that by using the movable part shaped according to the first embodiment shown in FIG. 6, the variation in inductance has an acceptable value only between 40 and 80 degrees. In the remaining part of the measurement range, variation as a function of the angle is insufficient. As shown in the graph, the greatest signal variations in fact occur when the movable disk 6 is located at the central part of the fixed part 4 (in this case, between 40 and 80 degrees a linear variation is present).

Variations in the inductive value, even if to a lesser extent, also occur when the movable disk 6 is located at the two long wings of the fixed part 4.

Accordingly, in order to achieve a more gradual inductance variation over the entire rotary stroke of the movable part, the fourth embodiment of the disk 36, which has one chamfered rim only, is used.

In this way, the inductive output signal, which constitutes the measure, has a linear behavior.

Figure 3:
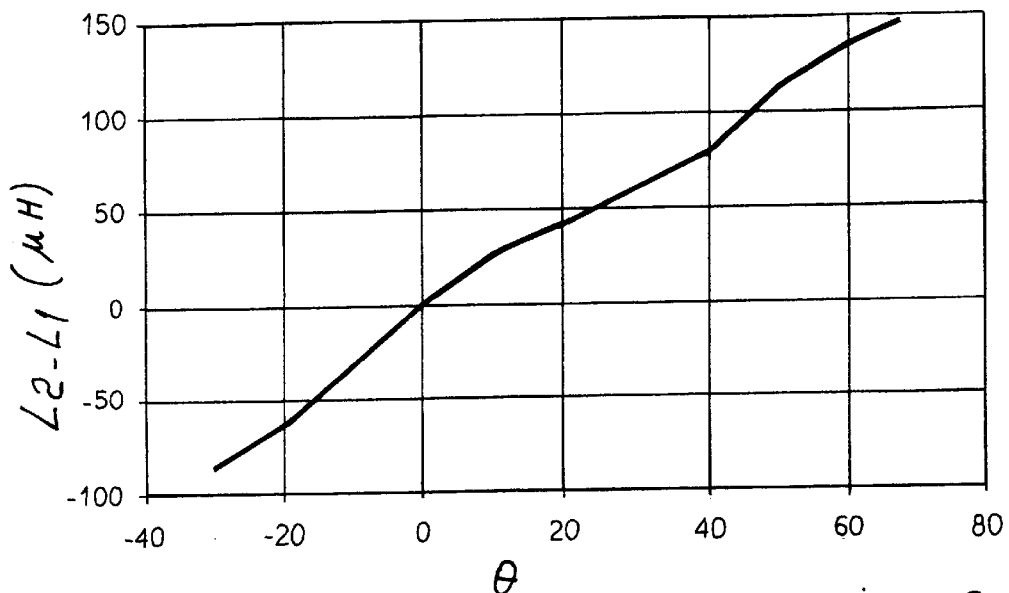
FIG. 3 is a graph illustrating the variation of the difference in inductance of the pickups as a function of the rotation angle of a spindle used in the device.

The graph of FIG. 3 illustrates the difference signal, which is obtained by subtracting the two inductive signals obtained, as a function of the rotation angle of the spindle 2 and therefore of the movable parts 36 rigidly fixed thereto.

As mentioned earlier, the two inductors $L_1$ and $L_2$ that constitute the pickup are inserted in an oscillator circuit of the relaxation type, which applies the above cited pulse to the networks $L_1C_1$ and $L_2C_2$. This pulse causes, for each network, free damped oscillations whose period T depends on the value of the corresponding inductance at that instant.

The counter circuit 25 then counts a fixed number N of said oscillations, generating two digital signals T1 and T2 which are proportional to the acquired inductance value, whose difference is given by a signal S1.

Switching between the networks $L_1C_1$ and $L_2C_2$ occurs every N oscillations.

The difference signal S1 obtained by subtracting the two signals T1 and T2 from each other constitutes the measure of the position of the stem of the valve. In turn, the signal S1 is corrected by temperature compensation with the signal S2.

In practice it has been observed that the device according to the invention fully achieves the intended aim, since it allows to provide a relative measurement of displacements by means of a differential system, minimizing all mechanical effects and displacements not caused by angular movement.

The electronic circuit used further allows to obtain two duration signals which depend on the detected rotation angle of the spindle, minimizing energy consumption.

The use of movable parts executed according to the above-described fourth embodiment allows to obtain a linear variation of the inductances as a function of the rotation angle of the spindle over the entire rotation range of said spindle.

The electronic circuit used is also compatible with the electronics used for pickups for pressure sensors, thus allowing to provide advantageous economies of scale.

The device thus conceived is susceptible of numerous modifications and variations, all of which are within the scope of the inventive concept; all the details may also be replaced with other technically equivalent elements.

In practice, the materials employed, so long as they are compatible with the specific use, as well as the dimensions, may be any according to requirements and to the state of the art.

What is claimed is:

1. A device for measuring the displacement of stems of valves, comprising a spindle coupled to a stem of a valve and provided with two inductive pickups, each inductive pickup comprising a fixed part and a movable part constituting a variable inductor, which, following a displacement of said stem and a rotation of the spindle coupled thereto, generates an inductance variation of electric circuit associated thereto; and electronic excitation and detection means which convert said inductance variations into a pair of digital signals whose difference is indicative of the displacement of the stem.

2. A device according to claim 1, wherein each fixed part of said two inductive pickups is rigidly coupled to a casing of said device, and each movable part is coupled to said spindle.

3. A device according to claim 2, wherein said fixed part is constituted by a ferrite core whereon a copper winding forming an excitation coil is provided.

4. A device according to claim 2, wherein said fixed part has a substantially E-shaped or U-shaped transverse cross-section in which the parallel wings of the E or U are chamfered to accommodate the rotation of said movable part.

5. A device according to claim 2, wherein said movable part is constituted by a ferrite disk which is adapted to be fitted, by means of a central hole, around said spindle, and has a chamfered raised rim arranged circumferentially around the disk itself.

6. A device according to claim 5, wherein each one of said disks is locked so as to be rigidly coupled to said spindle by means of a sleeve which is arranged around said spindle, between said disks, and is glued thereto.

7. A device according to claim 5, wherein the disks of said two inductive pickups coupled to said spindle are angularly rotated each other with respect to the rotation axis of the spindle.

8. A device according to claim 2, wherein said movable part is constituted by a ferrite disk which is fitted, by means of a central hole, around said spindle, and has a first raised rim arranged circumferentially around a portion of said disk.

9. A device according to claim 8, wherein said disk has a second chamfered raised rim which is arranged so as to be diametrically opposite with respect to said first raised rim.

10. A device according to claim 7, wherein each one of said disks is rigidly locked to said spindle on one side by means of a wedge-shaped plug and on the opposite side by means of a disk-like element provided with a locking grub screw.

11. A device according to claim 2, wherein said casing is constituted by one open part made of aluminum.

12. A device according to claim 2, wherein said casing is constituted by two halves made of aluminum which enclose said spindle between them, the fixed parts of said two inductive pickups being arranged on a plate which is rigidly coupled to said casing.

13. A device according to claim 2, wherein said electronic excitation and detection means are rigidly coupled to said containment casing.

14. A device according to claim 1, wherein said electronic excitation and detection means comprise a pulse generator circuit for applying pulses to networks constituted by the respective inductors of said two inductive pickup and by fixed capacitors, and a counter circuit for counting the oscillations induced in said networks which depend on the instantaneous value of said inductors, said value depending in turn on the position of said movable parts with respect to said fixed parts of the two inductive pickups, said counter circuit generating two signals the durations whereof are proportional to said detected inductance value.

15. A device according to claim 14, wherein said electronic excitation and detection means also comprise a combiner network in order to generate the difference between the signals generated by said counter circuit.

16. A method for measuring the displacement of stems of valves, comprising the steps of:

transforming the displacement of the stem into a rotation of a spindle coupled to said stem, said spindle being provided with two inductive pickups, each inductive pickup comprising a fixed part and a movable part constituting a variable inductor, which, following the displacement of said stem and a rotation of the spindle coupled thereto, generates an inductance variation of the electric circuit associated thereto;

converting, by electronic excitation and detection means, said inductance variations into a pair of digital signals;

carrying out the difference between said pair of digital signals, said difference being indicative of the displacement of the stem.

* * * * *